United States Patent [19]

Allen

[11] 4,089,555
[45] May 16, 1978

[54] WALL STAKE FOR VEHICLE SIDEWALL PANELING

[76] Inventor: John D. Allen, 5001 "A" St. (Apt. #6), Omaha, Nebr. 68106

[21] Appl. No.: 752,102

[22] Filed: Dec. 20, 1976

[51] Int. Cl.$^2$ .......................................... B62D 25/02
[52] U.S. Cl. ............................... 296/28 M; 105/380; 296/36; 296/43
[58] Field of Search ................ 296/36, 43, 104, 28 M; 280/143; 105/380

[56] References Cited

U.S. PATENT DOCUMENTS

| | | | |
|---|---|---|---|
| 1,737,730 | 12/1929 | Reidhaar | 296/36 |
| 2,022,869 | 12/1935 | Reid | 296/36 |
| 2,579,774 | 12/1951 | Akey | 296/43 |
| 3,837,702 | 9/1974 | Case | 296/36 |
| 3,940,179 | 2/1976 | McBride | 296/36 |
| 3,989,148 | 11/1976 | Donohue | 296/36 |
| 4,042,275 | 8/1977 | Glassmeyer | 296/36 |

Primary Examiner—Joseph F. Peters, Jr.
Assistant Examiner—John A. Carroll
Attorney, Agent, or Firm—George R. Nimmer

[57] ABSTRACT

Disclosed are wall stake structures adaptable for removable insertion into flat bed trailer and truck vehicles provided with a plurality of depending pockets whereby drayage vehicle sidewall paneling is supported by intervening upright wall stakes. The wall stake comprises: an upright non-metallic semi-rigid post having a header and a foot insertable into a flat bed vehicle pocket; a plurality of tubular spacers each extending transversely forwardly of the post; and an upright guide-plate abutting the respective spacers and ultimately attached to the post, the guide-plate being transversely more resilient than is the post and also being liberally wider laterally to provide two transversely resilient channels for supporting sidewall paneling. The spacers preferably comprise a plurality of vertically separated distinct tubular bushings which are removably attached to the post and guide-plate thereby facilitating manipulation of the paneling and permitting use of different thickness paneling. At the upper end of the wall stake post is provision for a secure and reliable seat to permit engagement with a transversely extending topbow canopy support.

9 Claims, 7 Drawing Figures

U.S. Patent  May 16, 1978  Sheet 1 of 3  4,089,555
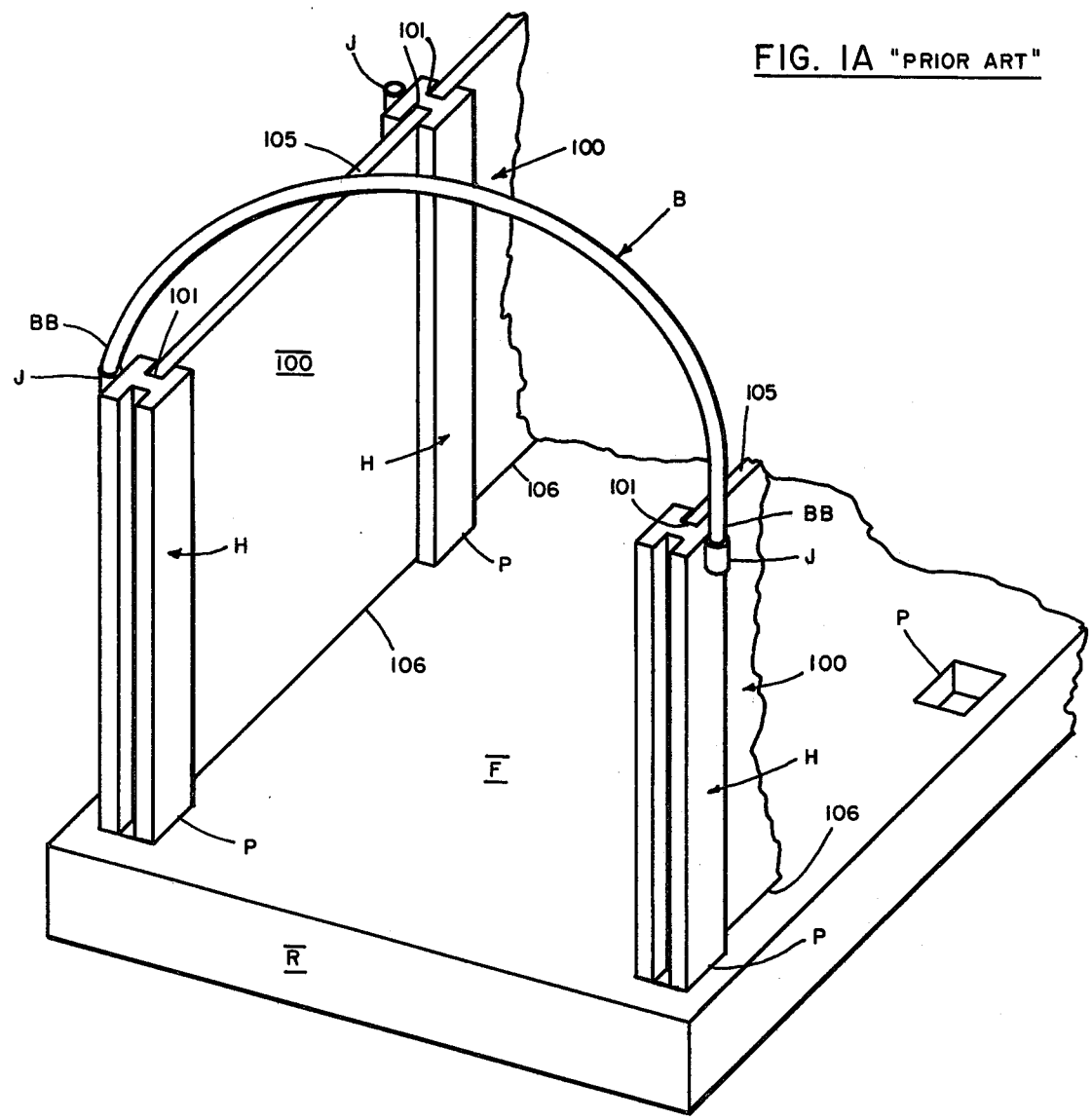
FIG. 1A "PRIOR ART"
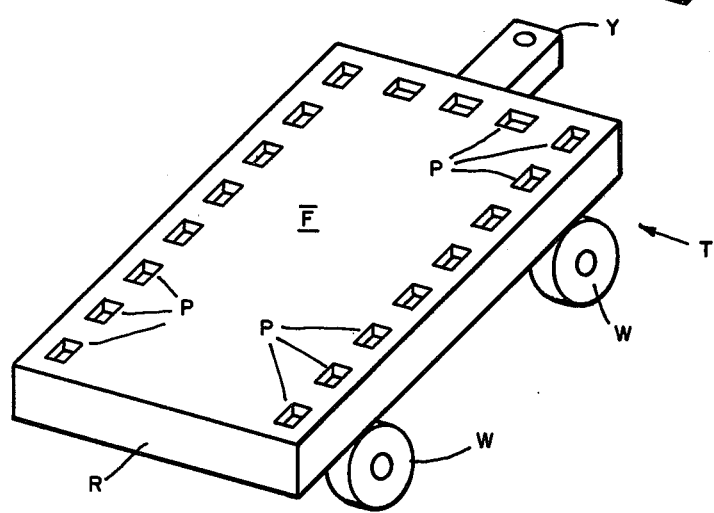
FIG. 1 "PRIOR ART"

WALL STAKE FOR VEHICLE SIDEWALL PANELING

Overland drayage vehicles of the flat bed type commonly include a plurality of depending pockets along the truck or trailer sides. Occasionally, depending upon the type of cargo to be hauled, such pocketed flat bed vehicles are provided with temporary sidewalls comprising stakes uprightly removably inserted into the flat bed pockets and elongate upright paneling (usually of plywood material) being uprightly removably supported by the intervening wall stakes. Among the prior art wall stakes are those described in U.S. Pat. Nos. 3,097,880; 3,162,224; 3,794,375; 3,837,702; and 3,940,179.

Wall stake constructions of the prior art suffer from one or more of the following disadvantages and deficiencies. Transversely shifting cargo loads can place a great deal of stress upon the wall stakes and the intervening elongate paneling. If wall stakes are made too rigid, a transversely shifting cargo load can cause fracture or permanent deformation. Even localized deformation at the wall stake channel will make subsequent dismantling of the paneling sidewalls extremely difficult, if not impossible. On the other hand, if wall stakes are made too transversely resilient throughout, they are unable to sustain the paneling and shifting cargo weights. A seeming solution to this dilemma had been to provide the wall stake preponderantly of base and alloy metals. However, such metallic wall stakes under actual roadway use conditions oftentimes fracture, or eventually become so corroded as to become practically impossible to remove from the metallic flat bed vehicle. Another problem common with prior art wall stakes is that they do not provide a reliable connector for the vehicle transversely extending topbow. Yet another problem associated with prior art wall stakes is that they cannot readily accommodate sidewall paneling of different thickness.

It is accordingly the general object of the present invention to provide an improved removable wall stake for flat bed vehicles sidewall paneling which overcomes the several disadvantages and deficiencies of prior art wall stakes.

With the said general and other objects and advantages in view, which will become more apparent as this description proceeds, the wall stake construction of the present invention generally comprises; an upright nonmetallic semi-rigid post having a header and a foot removably insertable into a vehicle pocket; and an upright resilient guide-plate having a lateral-extent liberally exceeding the post, said guide-plate being transversely forwardly spaced therefrom by a spacer means having a selectable transverse-length equivalent to the thickness of the insetable sidewall paneling, said spacer means and attachment means being preferably at vertically spaced distinct locations along the guide-plate height whereby the guide-plate is transversely resiliently deflectable over its entire lateral-extent.

In the drawing, wherein like characters refer to like parts in the several views, and in which;

FIG. 1 is a perspective view of a typical flat bed vehicle having depending pockets and providing a typical environment for the novel wall stakes of the present invention;

FIG. 1A is a typical prior art wall stake construction employed in the FIG. 1 embodiment flat bed vehicle;

Figures 2, 5, 5A:
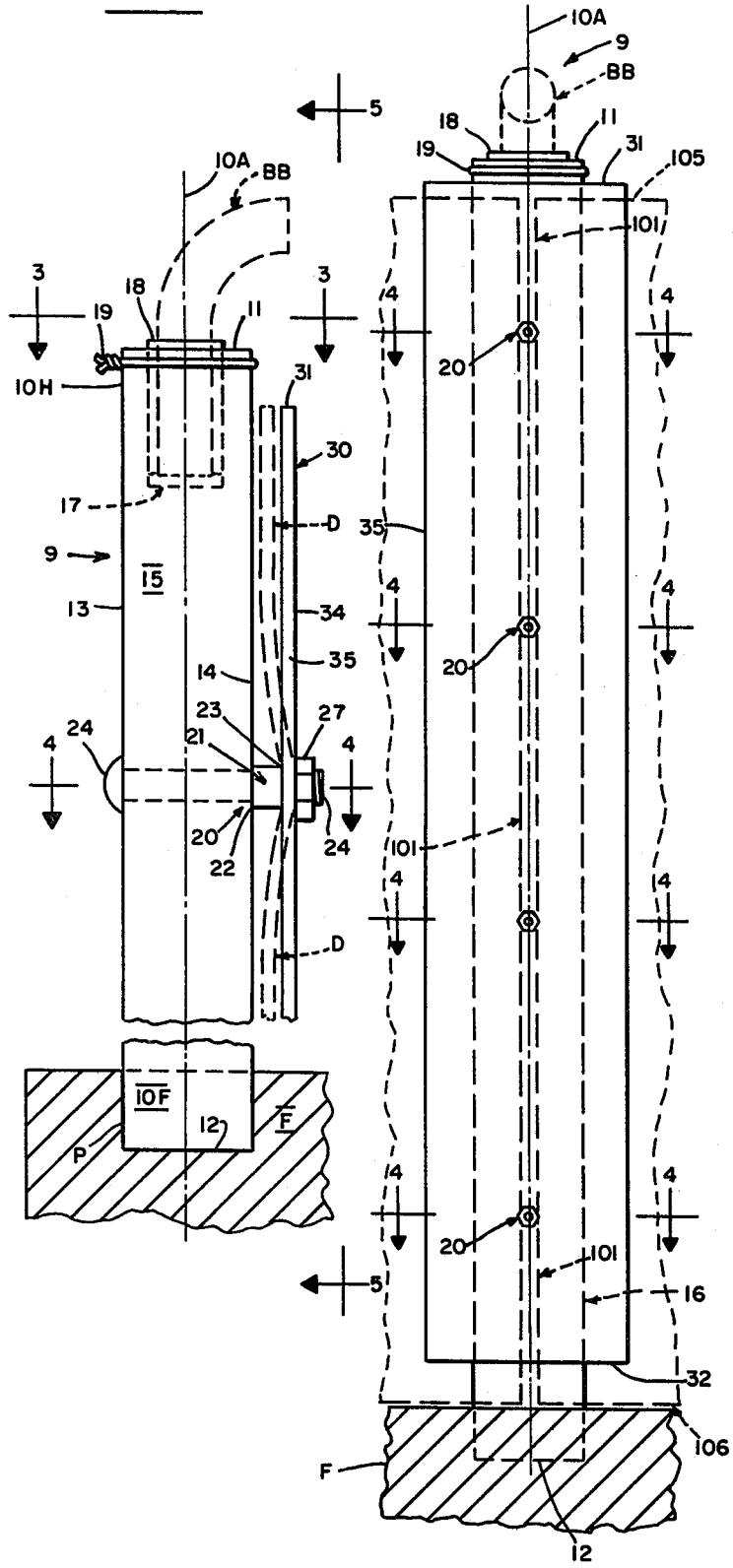
FIG. 2 is a side elevational view of a representative embodiment of the wall stake construction of the present invention.
FIG. 5 is a forward elevational view of the FIG. 2 wall stake embodiment.
FIG. 5A is a forward elevational view of a wall stake embodiment differing from FIG. 5 in that there is a much shorter upright height for the guide-plate portion.
Figure 3:
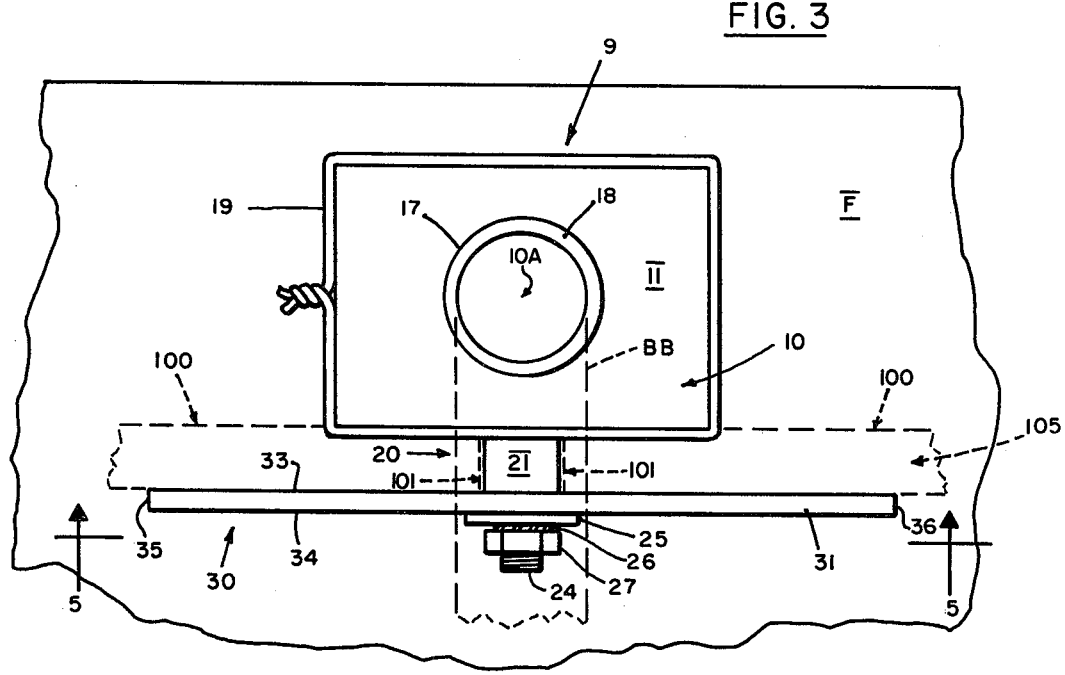
FIG. 3 is a top plan view of the FIG. 2 embodiment.
Figure 4:
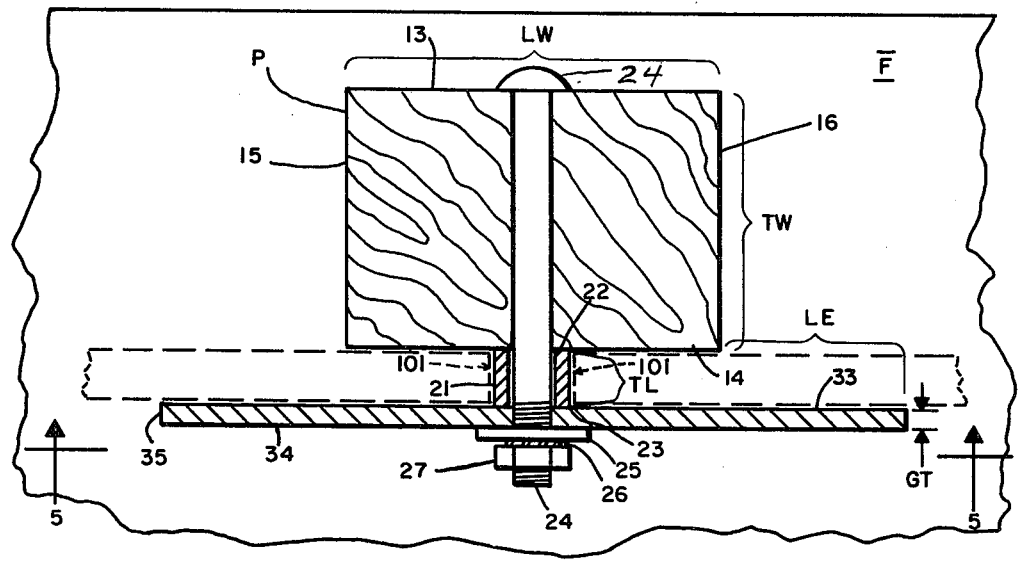
FIG. 4 is a sectional plan view taken along lines 4—4 of FIGS. 2, 5, and 5A.

Referring initially to FIGS. 1 and 1A which typify prior art relative to upright wall stakes for supporting sidewall paneling. A typical flat bed pocketed vehicle might take the form of trailer "T" having wheels "W", drawbar "Y", and horizontal flat bed "F" rearwardly terminating at "R". Incrementally spaced along the sides of flat bed "F", and customarily at two-feet intervals, are depending pockets "P" of a few inches finite-depth. The typical prior art wall stake "H" depicted in FIG. 1A is of extruded metal having a uniform H-shaped cross-section to provide two upright channels for the upright terminii of removably supported paneling 100. The upper and lower laterally extending horizontal terminii of paneling 100 are respectively indicated as 105 and 106 (at flat bed "F"). The lower end foot part of wall stake "H" is removably inserted into vehicle pocket "P" while the upper portion is provided with an offset tubular seat "J" for supporting the depending lower end "BB" of the transversely extending topbow "B" which in turn supports a canopy (not shown).

FIGS. 2-5 depict a representative embodiment 9 of the wall stake concept of the present invention. Wall stake 9 comprises an upright post 10 extending along a vertical-axis 10A from a header portion 10H at the post top-end 11 to a foot 10F at bottom-end 12 and which is removably emplantable into flat bed pocket "P". Inserted post 10 is semi-rigid in the transverse direction and preferably of nonmetallic construction whereby also corrosion at bed "F" does not occur and the foot 10F is mechanically shaveable to conform to the pocket shape and size encountered. Regularly rectangular cross-sectional sizes and shapes for post 10 are desireable, in which cases there are four upright elongate surfaces including rear-surface 13, front-surface 14 of a finite lateral-width "LW", a left-surface 15, and a right-surface 16 of a finite transverse-width "TW". To provide a transversely semi-rigid non-metallic emplanted post, which is preferably of oak wood, the rectangular cross-sectional area should exceed three square inches and with the TW/LW ratio being within the range of one-half to two.

Canopy supporting topbows "B" are customarily stationed at four-feet intervals, and thus, one-half or more the wall stakes used should have seating means e.g. "J", for a topbow lower end "BB". Herein, the post might be provided with a circular post-bore 17 extending downwardly from top-end 11 along vertical-axis 10A for a minor proportion of the post upright height 11–12 (which is typically a 4½ feet height). A metallic pipe 18 having a circular pipe-bore is frictionally secured within post-bore 17 to provide a seat for topbow lower end "BB". Topbows "B" exert appreciable transverse stresses upon its seating means e.g. "J", but which the concentric and metallic pipe seat 18 herein is admirably suited to withstand. In this vein, a twisted metallic wire 19 provides a girth-band located immediately below and surrounding post top-end 11 and co-elevational with pipe 18, which girth-band 19 prevents the non-metallic post header portion 10H from being ruptured by the forces exerted by topbow "B".

Cooperating with and attached to post 10 and forwardly transversely spaced therefrom a finite transverse-length "TL" is a guideplate 30 which in its lateral-distance 35–36 liberally exceeds the post lateral-width "LW" by a ratio of about two. Thus, the upright left-edge 35 and right-edge 36 of guide-plate 30 might protrude like lateral-extents "LE" beyond the post leftward and rightward terminii 15 and 16. Guide-plate 30 is necessarily structurally resiliently flexible as by having a relatively thin dimension "GT" between its rearward 33 and its forward 34 broad surfaces, which given-thickness "GT" might be on the order of about 16-gauge for sheet metal material. It is noted that 14-gauge sheet metal is marginally insufficiently flexible. Guide-plate 30 is preferably of rectangular shape including horizontal top-edge 31, horizontal bottom-edge 32, and two parallel vertical edges 35 and 36. Thus, guide-plate 30, spacer means 20, and post 10, together define a pair of upright channels located on opposite sides of spacers 20. Cross-sectionally, each wall stake channel has a transverse-length "TL", a rear lateral dimension of about one-half "LW", and a frontal lateral dimension of substantially one-half "LW" plus "LE", whereby paneling 100 is exceptionally well securable therein. Because of the structural resiliency of guide-plate 30, it is resistant to permanent deformation of transversely shifting cargo loads and ready removal of paneling 100 from the wall stake channels is practically ensured. The guide-plate top-edge 31 is located a few inches below post top-end 11 and nearer thereto than to post bottom-end 12. For the wall stake embodiment 9 shown in FIG. 5, the guide-plate height 31–32 is appropriate to the paneling upright terminii 101, which is substantially the channel height or about four-feet for standardized plywood type sidewall paneling.

The forwardly transversely extending spacer means and the attachment means between post 10 and guide-plate 30 are preferably located at vertically separated and distinctly isolated locations. Accordingly, between each distinct spacer means station (20), the guide-plate 30 is desirably transversely resilient for its entire lateral-distance 35–36 as indicated in phantom line "D". Herein, each distinct spacer means station 20 comprises a tubular cylindrical bushing 21 having a rearward inner-end 22 abutting post front-surface 14 and a forward outer-end 23 abutting guide-plate rear-face 33, transverse distance 22–23 being "TL". A headed fastener bolt 24 at each spacer station 20 passes horizontally through post 10, thence bushing 21, and finally guide-plate 30 midway edges 35 and 36. Completing the fastener arrangement forwardly of guide-plate 30 and surrounding bolt 24 are: washer 25, lock-washer 26, and finally nut 27 threadedly engaged with bolt 24. Accordingly, with such removably secured fastener means 24–27, the bushing 21 can be readily replaced with another bushing 21 but of a different transverse-length "TL". This allows a selectable transverse-length "TL" for the two wall stake channels and equivalent to the transverse thickness of the paneling (e.g. 100) available for or otherwise appropriate to the flat bed cargo carrying vehicle. Preferably, the inside diameter of removably secured cylindrical spacer bushing 21 slightly exceeds the diameter of bolt 24; this loosely surrounding relationship facilitates ready removal of paneling from the two upright channels of each wall stake.

For the FIG. 5 wall stake embodiment having the guide-plate bottom-edge 32 nearer post bottom-end 12, the wall stake channels secure the upright endward terminii 101 of elongate paneling. However, sidewall paneling utilized is oftentimes of 4-feet and even 8-feet lateral lengths. As previously pointed out, pockets "P" are commonly spaced at 2-feet increments along the flat bed cargo-carrying vehicle. Accordingly, paneling 100 is oftentimes additionally supported by wall stakes 99 located intermediate the paneling endward terminii 101, such as at vertically notched portions 102 extending downwardly of panel top-edge 105. For such purpose, and as indicated in FIG. 5A, with intermediately employed 102 wall stakes 99, the guide-plate bottom-edge 32 is located much nearer to post top-end 11 than to bottom-end 12. For example, a guide-plate height 31–32 about twelve-inches would be typical. In such situations, the spacer means e.g. 21, are located within the downwardly notched intermediate portions 102 of paneling 100.

After many re-insertions and removals of sidewall paneling from the wall stake channels, the upright terminii 101 might eventually become worn drastically thinner than the channel transverse-length "TL". To compensate for such panel wearing, one might select a bushing of appropriately shorter transverse-length (e.g. 22–23), or even select a softer structural material for the post 10 whereby further tightening of nut 27 will partially embed bushing 21 therein which effectively shortens the transverse-length between post and guide-plate.

From the foregoing, the construction and operation of the wall stake for vehicle sidewall paneling will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. A wall stake adaptable for removable insertion into a flat bed vehicle provided with a plurality of depending pockets, said wall stake being adaptable for uprightly supporting vehicle sidewall paneling and comprising:
   A. an upright post extending along a vertical-axis from a header at the post top-end to a foot at the post bottom-end, said post having an upright periphery surrounding said vertical-axis and including a uniplanar front-surface of a finite lateral-width, a left-surface, and a right-surface, said post having a cross-sectional size of at least about three square inches whereby said post is semi-rigid in the transverse direction when its foot is removably implanted into a vehicle depending pocket;
   B. a plurality of vertically separated and distinct tubular bushing spacers each located substantially halfway between the post left and right surfaces and extending a given transverse-length forwardly perpendicularly from the post front-surface; and
   C. an upright structurally resilient guide-plate abutting the said spacers and being attached to the post with a plurality of distinct fasteners each extending transversely through the post, the tubular bushing spacer, and the guide-plate, said guide-plate having a finite given-thickness defined by a pair of transversely separated broad faces, one of which includes the rear-face of said guide-plate located at the spacers and the other of which includes the front-face of said guide-plate, said guide-plate having a bottom-edge located some finite height above the post bottom-end and a top-edge located immediately below the post top-end, the guide-plate also having a pair of substantially parallel upright edges including a leftedge and a right-edge separated by a finite lateral-distance bearing a ratio of at least two compared to the post lateral-width whereby said guide-plate upright edges extend substantially like lateral-extensions beyond the post left and right surfaces so as to provide a pair of similar paneling channels defined by the post and the rear-faced of the guide-plate, the guide-plate given-thickness being sufficiently thin such that the guide-plate is more transversely resilient than is the implanted post, and a vertical separation between each of the respective distinct spacers being sufficiently great such that the entire guide-plate between said spacers is transversely resiliently defelectable over the entire lateral-distance thereof.

2. The wall stake of claim 1 wherein the post has a regular rectangular cross-sectional shape of a finite transverse-width and is of wooden structural material; and wherein the guide-plate is of resiliently flexible metallic sheet material.

3. The wall stake of claim 2 wherein the post is provided with a post-bore extending downwardly from the post top-end along the vertical-axis along a minor proportion of the post upright height; wherein a metallic pipe having a circular pipe-bore seat is secured within the post-bore; and wherein there is a girth-band tightly surrounding the post header above the guide-plate top-edge to prevent the wooden post from splitting during periods when a vehicle topbow is downwardly engaged into the pipe-bore seat.

4. The wall stake of claim 3 wherein the guide-plate bottom-edge is located nearer to the post top-end than to the post bottom-end whereby to accommodate notched medial portions of very elongated paneling.

5. The wall stake of claim 1 wherein the guide-plate bottom-edge is located nearer to the post top-end than to the post bottom-end whereby to accommodate notched intermediate portions of very elongated side-wall paneling.

6. The wall stake of claim 1 wherein the respective spacers comprise tubular cylindrical bushings; and wherein each distinct fastener passes transversely through the post, the cylindrically tubular spacer bushing, and the guide-plate.

7. The wall stake of claim 6 wherein the respective spacers loosely surround the fasteners to promote ready removal of paneling from the stake upright channels; and wherein the fasteners comprise threaded bolts removably secured to the post and guide-plate to facilitate replacement of said spacers having different transverse-lengths appropriate to the selected paneling thickness.

8. The wall stake of claim 7 wherein the guide-plate bottom-edge is located nearer to the post bottom-end than to the post top-end whereby to accommodate the upright terminii of the side-wall paneling.

9. The wall stake of claim 1 where the guide-plate is substantially rectangular; and wherein the post is of wooden structural material and provided with a post-bore extending downwardly from the post top-end along the vertical-axis for a minor proportion of the post upright height, there being a metallic pipe having a circular pipe-bore seat tightly secured within the post-bore.

* * * * *